Patented July 31, 1934

1,968,253

UNITED STATES PATENT OFFICE 1,968,253

MANUFACTURE OF PHTHALIMIDE

Alphons O. Jaeger, Mount Lebanon, and Lloyd C. Daniels, Crafton, Pa., assignors, by mesne assignments, to The Selden Research & Engineering Corporation, Pittsburgh, Pa., a corporation of Delaware No Drawing. Application November 17, 1930, Serial No. 496,349

19 Claims. (Cl. 260—124)

This invention relates to the manufacture of phthalimide and N-substituted phthalimides, and more particularly to the production of phthalimide and N-substituted phthalimides of high purity from impure raw material.

In the past phthalimide has been produced by passing ammonia gas into molten phthalic anhydride, the phthalic anhydride used being of course of the grade ordinarily obtained on the market, that is to say practically chemically pure. This process, while resulting in a phthalimide of excellent purity with good yields, is nevertheless very expensive as the equipment cost is high, it is difficult to handle the ammonia gas, and anhydrous ammonia must be used which is the most expensive form of ammonia.

The present invention starts out from a different raw material, namely, crude ammonium or substituted ammonium phthalates, either the mono- or di- salt. The salt is merely heated to a temperature at which phthalimides are formed and as fast as it is formed it sublimes and when condensed, especially in condensers maintained at a suitable, predetermined high temperature, phthalimides of high purity are obtained. The ammonium phthalate or substituted phthalates are not prepared from pure phthalic anhydride; on the contrary, the ammonium phthalate is obtained from crude air oxidation phthalic anhydride. Thus, for example, the converter product containing large quantities of impurities such as maleic acid, alphanaphthaquinone and the like is simply dissolved in ammonia water or an aqueous solution of the desired primary amine. The ammonia water does not need to be of any specially high purity, ordinary by-product ammonia liquor being entirely suitable, and it is even possible to use grades of phthalic anhydride which are so impure as to be incapable of working up into purified phthalic anhydride at any cost permitting their economical use. Thus, for example, when crude phthalic anhydride is purified by distillation a tar or coke residue is obtained which contains a considerable amount of phthalic anhydride together with all of the impurities originally in the phthalic anhydride and formed by pyrolitic composition during distillation. This coke can be leached with ammonia water, and the ammonium phthalate thus obtained will give phthalimide of high purity when heated and sublimed. Another source of crude ammonium phthalate is from the tailings of the condensers in which the phthalic anhydride vapors from converters in which it is produced are fractionally condensed. These tailings require several steps of purification, and their value is so low that in some cases it is cheaper to throw them away than to attempt to purify them. They are highly colored, green, red and yellow, and the ammonium phthalate produced therefrom is also highly colored and of very low purity. Despite its high content of impurities, when used in the process of the present invention phthalimide of high purity can be obtained.

Another source of crude phthalic anhydride lies in the so-called fume tower tailings, that is to say the liquor which is obtained in the so-called fume towers where the exhaust gases from phthalic anhydride condensers are scrubbed in order to prevent the discharge of acid vapors into the atmosphere. These liquors have hitherto simply been thrown away. They contain phthalic anhydride together with other impurities and when treated to produce the ammonium salt a raw material is obtained which can be used to excellent effect in the present invention.

While, surprising as it may seem, phthalimide of very high chemical purity is obtaintable directly in a single, cheap operation from extremely crude ammonium phthalate, sometimes a trace of the color-forming impurities are likewise sublimed as they are slightly volatile, and when phthalimide is produced from highly colored ammonium phthalate in some cases it departs from the pure water-white color which is normally obtained by the process of the present invention since even a trace of colored impurity which may be too small to be determined by analysis will considerably affect the shade of the product. When highly colored ammonium phthalate is used, it is, therefore, preferable to pass the vapors from the sublimer containing the phthalimide through a catalytic adsorbent for colored impurities, such as is described for the sublimation of phthalic anhydride in the co-pending application of Alphons O. Jaeger, Serial No. 337,534 filed February 4, 1929. We have found that the best catalytic adsorbent for this purpose is alumina gel. The adsorbent can, of course, be readily regenerated when after use it becomes charged with color by burning out the color with a blast of hot air or other means as described in the Jaeger application above referred to.

Theoretically phthalimide results without loss of ammonia when monoammonium phthalate is heated, but practically a certain excess of ammonia appears to be necessary in order to obtain high yields, which under normal operation are practically quantitative except for slight losses due to the volatility of the product and due to the fact that it is not economical to carry the sublimation down to sublime out of the last fraction of a percent of phthalimide. We, therefore, prefer to use an amount of ammonia which will give an ammonium phthalate containing more ammonia than that corresponding to the monoammonium salt. A small excess of ammonia is satisfactory, but since many of the sources of phthalic anhydride are so crude that their phthalic anhydride content is not ordinarily known exactly because it varies with different batches and even in different portions of the same batch, a considerable excess of ammonia water is ordinarily used, and if desired sufficient ammonia may be present to form the di-ammonium phthalate, in which case on heating the excess ammonia is given off as phthalimide is formed. This ammonia, which is not under pressure, can, of course, be readily recovered before phthalimide begins to sublime over, and the present invention includes either processes in which the ammonia is kept close to the theoretical amount and no recovery is attempted of any excesses of ammonia or processes in which a large excess of ammonia is used with or without recovery of the excess. The choice of the particular modification will ordinarily depend on the raw material used and on other economical considerations. In general the higher the phthalic anhydride content of the raw material used the smaller the excess of ammonia needed to effect rapid formation of the ammonium phthalate. It should be understood, of course, that when the ammonium phthalate solution is heated, water is first given off and distills over, together with any ammonia, in case an excess is used, at temperatures far below that at which phthalimide begins to sublime. The phthalimide normally obtained is anhydrous, provided the condenser is maintained at a temperature sufficiently high so that moisture will not condense. In the preferred modifications of the present invention, therefore, condensation at such elevated temperatures is normally used, but of course the invention is in no sense limited to using a hot condenser but in such cases care has to be taken that the ammonium phthalate is dry before being sublimed. A hot condenser presents the further advantage that steam can be used as an inert subliming gas without contaminating the product when the hot condenser is maintained above the boiling point of water. As steam is a very satisfactory subliming medium possessing high heat capacity, sufficient inertness, and being the cheapest known non-oxidizing gas available, the use of a hot condenser permits considerable economy.

The temperature at which the sublimation takes place is capable of variation within wide limits, the process being operable from temperatures of around 150 to temperatures well over 300° C. At the lower temperatures, however, the rate of sublimation is too slow to be commercially attractive and at the higher temperatures there is a certain amount of loss through decomposition of the products. Ordinarily, therefore, the subliming temperature is maintained between 250 and 300° C. and this may be considered the preferred range for economical operation, but the invention is in no sense limited thereto and it is in fact an advantage of the present invention that the temperature range is so wide that elaborate control means are unnecessary. While it is possible to operate the process with minimum temperature control in the sublimer and condenser, it is nevertheless desirable to maintain the temperatures, particularly in the condenser, fairly uniform. The condenser temperature may be any temperature below the melting point of phthalimide (238° C.) and below the point at which phthalimide sublimes in large quantities.

The invention has been described more particularly in connection with the production of unsubstituted phthalimide. Where substituted phthalimides are to be produced, the corresponding primary amine is used. Thus, for example, methylphthalimide is obtained from methylamine, omegahydroxyethylphthalimide from ethanolamine, etc. The reaction is generally applicable to primary amines which form phthalimides having sufficient vapor pressure to permit subliming out from the reaction mixture. Where amines are used which produce phthalimides of low volatility, for example phthalanilide, higher sublimation temperatures should ordinarily be employed.

The invention will be described in greater detail in connection with the following specific examples, which illustrate various typical modifications thereof.

*Example 1*

Crude phthalic anhydride as it is condensed from the converters, being of a grayish or pinkish color, containing impurities such as alphanaphthaquinone and its condensation products, is treated with an aqueous solution of ammonia, the amount of ammonia being sufficient to form the mono-salt with about a 10% excess. The solution is evaporated and dried in a drier, and the crude dry ammonium phthalate charged into a sublimer. The temperature is raised to 280° C. and a stream of air or inert gas such as carbon dioxide, nitrogen, stack gases from steam generators, etc. is passed over or through the molten mass. The transformation of the monoammonium phthalate to phthalimide takes place of course at temperatures considerably below 280° C. so that by the time the still contents has reached 280° C. a large portion of the ammonium phthalate is transformed into phthalimide and sublimes out. The phthalimide is condensed in a condenser which, if desired, may be maintained at a sufficiently high temperature so that any volatile impurities present do not condense; the temperature of course must be well below the melting point of phthalimide, 238° C., otherwise the phthalimide will not be obtained in crystal form.

*Example 2*

Coke obtained from the distillation of impure catalytic air oxidation phthalic anhydride containing from 35 to 50% phthalic anhydride is ground to a fine powder and leached with an ammonia solution containing slightly less than sufficient ammonia to form the di-ammonium phthalate. The reason for using an amount of ammonia slightly less than sufficient to neutralize all of the acid lies in the fact that in alkaline solution a number of the impurities contained in the original phthalic anhydride are soluble, especially some of the colored impurities. Therefore, if enough ammonia is used to more than neutralize the phthalic anhydride present, a more highly colored and more impure ammonium phthalate results. The aqueous solution of ammonium phthalate thus obtained is treated as in Example 1, but since ammonia is given off while the temperature rises to 280° C. preferably the provision is made for recovering this ammonia by passing through cold water or any other suitable means. When the sublimer temperature has reached approximately 280° C. the carrier gas, which may be air, is passed through the sublimer and the vapors are caused to pass through a metal basket containing alumina gel fragments which adsorb any traces of colored impurities present in the vapors. A pure water-white phthalimide condenses out in the form of glistening plates or leaves. It should be noted that the colorless product is obtained from an ammonium phthalate which is highly colored.

Instead of leaching the coke with an ammonia solution, it may be leached with water, a solution if impure phthalic anhydride being obtained which is then treated with ammonia, and the ammonium phthalate obtained treated as above.

Example 3

The tailings from the condensation of phthalic anhydride vapors from a converter, which tailings contain from 50-75% phthalic anhydride together with large amounts of maleic acid, naphthaquinone and similar impurities, being dirty pink or green, are preferably subjected to a treatment for separating out maleic acid, for example by precipitating the acid sodium maleate as described in the copending application of Heinrich W. Witzel Serial No. 484,707 filed September 26, 1930. The remaining crude sodium acid phthalate is acidified and the phthalic acid formed then dissolved in ammonia water containing sufficient ammonia to form the mono-salt, together with 10-50% excess. This solution of crude ammonium phthalate is then treated as in Example 1, the vapors from the sublimer being passed through alumina gel or similar adsorbent if any color is noted in the phthalimide produced.

Example 4

Fume tower liquor, for example obtained by using calcium hydroxide or calcium carbonate in the fume tower as described in the co-pending application of Alphons O. Jaeger Serial No. 359,721 filed May 1, 1929 and patent of Frank A. Canon No. 1,716,028 dated June 4, 1929, is treated with an ammonium carbonate solution, calcium carbonate being precipitated out and the aqueous solution of ammonium phthalate, which may preferably contain sufficient ammonia to correspond to the di-ammonium salt with a slight excess, is filtered off and treated as in Example 1, a high grade phthalimide being obtained.

Example 5

The tar or pitch, obtained by the distillation of crude phthalic anhydride where the distillation is stopped short of coke formation, contains 50% or more phthalic anhydride and is agitated hot with ammonia water sufficient to combine with all of the phthalic anhydride present to form the di-ammonium salt. After filtering off from the tar-forming constituents the solution is treated as in Example 2, a pure snow-white phthalimide being obtained.

Example 6

A crude phthalic anhydride such as described in Example 3 is moistened with a strong ammonia water containing an amount of ammonia somewhat in excess of that required to form the mono-ammonium phthalate. This moistened material is then sublimed, preferably with superheated steam, and the phthalimide formed recovered in a hot condenser maintained at a temperature below the melting point of phthalimide but above the boiling point of water. This method avoids the necessity for evaporating a solution of ammonium phthalate to dryness.

In a similar manner, other crude materials containing phthalic anhydride may be treated.

Example 7

Crude phthalic anhydride as described in Example 1 is treated with an aqueous solution of ethanolamine in amount sufficient to form the ethanolamine monophthalate with about a 5 to 10% excess. The solution is evaporated, dried in a drier, and the crude dry ethanolamine phthalate is charged into the sublimer. The temperature is raised from 280 to 310° C. and a stream of inert gas, such as carbon dioxide or superheated steam, is passed through the mass. Omegahydroxyethylphthalimide sublimes out, and is preferably condensed in a hot condenser maintained at a temperature above the boiling point of water but of course being below the melting point of the omegahydroxyethylphthalimide.

Example 8

Coke containing phthalic anhydride such as described in Example 2 is ground to a fine powder and leached with an aqueous solution of monomethylamine, the amount of amine being somewhat less than sufficient to form the methylamine diphthalate. The product is then further treated as described in Example 2 and on sublimation N-methyl phthalimide is obtained in a state of high purity.

Example 9

Crude phthalic anhydride such as described in Example 1 is treated with an aqueous emulsion of aniline to obtain the mono-aniline phthalate. Water is drawn off and the material is then subjected to sublimation in an inert gas at temperatures of from 280-350° C., if desired under diminished pressure. Phthalanilide slowly sublimes out and is condensed in a state of high purity.

What is claimed as new is:

1. A method of producing pure phthalimide, which comprises bringing about the reaction of crude or impure air oxidation phthalic anhydride products with a solution of a compound containing the ammonium base and capable of reacting with the phthalic anhydride product, the amount of ammonia being at least sufficient to form the mono-ammonium phthalate, evaporating off the water, subjecting the residue to heating at temperatures at which pure phthalimide is formed and sublimes and condensing the pure phthalimide contained in the vapors.

2. A method according to claim 1, in which the pure phthalimide containing vapors are passed through a catalytic adsorbent.

3. A method according to claim 1, in which the vapors containing pure phthalimide are passed through alumina gel.

4. A method according to claim 1, in which the crude product is fume tower liquor from the scrubbing of the effluent gases from the condensers in which the vapors from phthalic anhydride converters are condensed.

5. A method according to claim 1, in which the subliming carrier gas contains superheated steam and the condensation of the pure phthalimide takes place in a condenser maintained at a temperature above the boiling point of water.

6. A method of producing pure phthalimide, which comprises treating a crude or impure air oxidation phthalic anhydride product with an aqueous solution of ammonia, the ammonia being present in amount at least sufficient to form the mono-ammonium phthalate, evaporating off the water, subliming the residue at temperatures at which pure phthalimide forms and condensing the pure phthalimide contained in the vapors.

7. A method according to claim 6, in which the pure phthalimide containing vapors are passed through a catalytic adsorbent.

8. A method according to claim 6, in which the vapors containing pure phthalimide are passed through alumina gel.

9. A method according to claim 6, in which the temperature of sublimation is between 250 and 300° C.

10. A method according to claim 6, in which the phthalic anhydride product is crude converter product obtained by condensing the vapors from a catalytic air oxidation phthalic anhydride converter.

11. A method according to claim 6, in which the crude product is the residue from distilling impure catalytic air oxidation phthalic anhydride.

12. A method according to claim 6, in which the subliming carrier gas contains superheated steam and the condensation of the pure phthalimide takes place in a condenser maintained at a temperature above the boiling point of water.

13. A method of producing pure phthalimide, which comprises moistening a material containing crude or impure air oxidation phthalic anhydride with an ammonia solution containing an amount of ammonia at least sufficient to form the mono-ammonium phthalate, heating the material at temperatures at which pure phthalimide is formed and sublimes, and condensing the pure phthalimide in the vapors.

14. A method according to claim 13, in which the subliming carrier gas contains superheated steam and the condensation of the pure phthalimide takes place in a condenser maintained at a temperature above the boiling point of water.

15. A method of producing a pure phthalimide, which comprises bringing about the reaction of crude or impure air oxidation phthalic anhydride products with a compound containing an ammonium base in which not more than one hydrogen is replaced by an organic radical, which compound is capable of reacting with the phthalic anhydride product, the amount of ammonium base being at least sufficient to form the monophthalate of the ammonium base, removing any water present, and subjecting the residue to heating at temperatures at which the pure phthalimide is formed and sublimes, and condensing the pure phthalimide contained in the vapors.

16. A method according to claim 15, in which the vapors containing the pure phthalimide are passed through a catalytic adsorbent.

17. A method according to claim 15, in which the vapors containing the pure phthalimide are passed through alumina gel.

18. A method according to claim 15, in which the ammonium base is a primary hydroxyalkylamine.

19. A method according to claim 15, in which the ammonium base is ethanolamine.

ALPHONS O. JAEGER.
LLOYD C. DANIELS.